US008443446B2

(12) United States Patent
Lamastra et al.

(10) Patent No.: US 8,443,446 B2
(45) Date of Patent: May 14, 2013

(54) METHOD AND SYSTEM FOR IDENTIFYING MALICIOUS MESSAGES IN MOBILE COMMUNICATION NETWORKS, RELATED NETWORK AND COMPUTER PROGRAM PRODUCT THEREFOR

(75) Inventors: Gerardo Lamastra, Turin (IT); Gianluca Cangini, Turin (IT); Francesco Coda Zabetta, Turin (IT); Luigi Sperti, Turin (IT)

(73) Assignee: Telecom Italia S.p.A., Milan (IT)

( * ) Notice: Subject to any disclaimer, the term of this patent is extended or adjusted under 35 U.S.C. 154(b) by 905 days.

(21) Appl. No.: 12/225,684

(22) PCT Filed: Mar. 27, 2006

(86) PCT No.: PCT/EP2006/002787
§ 371 (c)(1),
(2), (4) Date: Sep. 21, 2009

(87) PCT Pub. No.: WO2007/110093
PCT Pub. Date: Oct. 4, 2007

(65) Prior Publication Data
US 2012/0151585 A1    Jun. 14, 2012

(51) Int. Cl.
*H04L 29/06* (2006.01)
(52) U.S. Cl.
USPC .............. 726/24; 726/22; 726/23; 713/188
(58) Field of Classification Search .............. 726/22–24; 713/188
See application file for complete search history.

(56) References Cited

U.S. PATENT DOCUMENTS

| 2002/0042886 | A1 | 4/2002 | Lahti et al. |
| 2002/0162025 | A1 | 10/2002 | Sutton et al. |
| 2003/0084321 | A1 | 5/2003 | Tarquini et al. |

(Continued)

FOREIGN PATENT DOCUMENTS

| GB | 2 382 755 | 6/2003 |
| WO | WO 03/012644 A1 | 2/2003 |
| WO | WO 03/100581 A2 | 12/2003 |
| WO | WO 03/100581 A3 | 12/2003 |

OTHER PUBLICATIONS

Spitzner, L., "Definitions of Honeypots," Honeypot: Tracking Hackers, Addison-Wesley Professional, p. 40, (Oct. 9, 2002).
Maurer, U. M., "A Universal Statistical Test for Random Bit Generators," Journal of Cryptology, vol. 5, No 2, pp. 89-105 (pp. 1-19), (1992).

*Primary Examiner* — Justin T Darrow
(74) *Attorney, Agent, or Firm* — Finnegan, Henderson, Farabow, Garrett & Dunner, L.L.P.

(57) ABSTRACT

A system for identifying malicious messages transmitted over a mobile communication network includes: sentinel modules associated with respective mobile terminals in the network for monitoring messages passing therethrough, wherein the sentinel modules identify as a candidate malicious message, any message passing through the mobile terminals and failing to comply with a first set of patterns and issue a corresponding sentinel identification message; a set of probe modules for monitoring messages transmitted over the network, wherein the probe modules identify as a candidate malicious message any message transmitted over the network and failing to comply with a second set of patterns and issue a corresponding probe identification message; and preferably at least one client honeypot module for receiving and processing any messages sent thereto to produce corresponding processing results, wherein the client honeypot module identifies as a candidate malicious message any message producing a processing result failing to comply with a third set of patterns and issues a corresponding client honeypot identification message.

25 Claims, 4 Drawing Sheets

U.S. PATENT DOCUMENTS

| | | |
|---|---|---|
| 2003/0105973 A1 | 6/2003 | Liang et al. |
| 2003/0219008 A1 | 11/2003 | Hrastar |
| 2004/0098482 A1* | 5/2004 | Asano .......................... 709/225 |
| 2006/0037075 A1* | 2/2006 | Frattura et al. .................. 726/22 |
| 2008/0319995 A1* | 12/2008 | Alspector et al. ................ 707/6 |

* cited by examiner

METHOD AND SYSTEM FOR IDENTIFYING MALICIOUS MESSAGES IN MOBILE COMMUNICATION NETWORKS, RELATED NETWORK AND COMPUTER PROGRAM PRODUCT THEREFOR

CROSS REFERENCE TO RELATED APPLICATION

This application is a national phase application based on PCT/EP2006/002787, filed Mar. 27, 2006, the content of which is incorporated herein by reference.

FIELD OF THE INVENTION

The present invention relates to techniques for identifying "malicious" messages (or "malware"), that is malicious software designed to damage or disrupt a system.

The invention was developed by paying specific attention to the possible application in the field of cellular phone security, with the aim of providing e.g. early detection of attacks capable of infecting a mobile device in a communication network.

As used herein, the term "message" is meant to apply to any structured set of data adapted to be transmitted over a network. Consequently, the designation "malicious messages" is intended to cover i.a. "spam" and "phishing". The term "spam" is used to identify all the unwanted electronic junk messages—mainly e-mail, but in mobile context also messages coming from Short Message Service (SMS) and Multimedia Messaging Service (MMS) or other. The term "phishing" (also known as "carding" and "spoofing") denotes the act of attempting to fraudulently acquire sensitive information, such as passwords and credit card details. This is usually attempted by masquerading as a trustworthy person or business with a real need for such information in a seemingly official electronic notification or message (most often an email, or an instant message).

DESCRIPTION OF THE RELATED ART

Modern cellular phones are similar to standard personal computers; they provide advanced functionalities such as e-mail and multimedia messaging, personal contact management, document reading, picture and message recording. Moreover, they also include advanced mechanisms to connect to data networks, so to virtually support any form of electronic transaction that can be done with ordinary computers. These considerations make mobile devices an ideal target for electronic attacks that can disrupt both their functionalities and those of the network itself.

In general terms, the problem of protecting a communication network against malware has been extensively investigated in the art, also in connection with mobile networks, as witnessed e.g. by WO 03/012644 A1, US 2002/0042886 A1, US 2003/0084321 A1 or WO 03/100581 A1.

Similarly known is the concept of using an early-warning network for detecting the diffusion of viruses.

For instance, US 2003/0105973 A1 discloses a system that exploits the concept of early warning monitors in a network environment.

Document US 2003/0219008 A1 discloses an invention related to the use of a "honeypot" device in the context of wireless LANs. The concept of honeypot is well known in the security literature and has been applied to different contexts: see, for instance, L. Spitzner "Honeypot: Tracking Hackers", Addison-Wesley Professional, Oct. 9, 2002, page 40. Specifically, in US 2003/0219008 A1, a honeypot is used to capture the intruder and keep it on a different radio channel, while the remaining part of the network is switched on another channel. Such a honeypot is essentially designed with the aim of emulating a wireless access point, which acts just like a network server providing support for wireless-to-wired network switching.

OBJECT AND SUMMARY OF THE INVENTION

So far, the most successful standard technology that has been adapted to the mobile context is the anti-virus system; anti-virus systems operate by analyzing the executable programs present on the cellular phone, searching for pattern that are associated with well-known malware. Anti-virus systems suffer from two fundamental limitations: first, an anti-virus system needs to be continuously updated with fresh signatures to keep the pace with the newest threats; second, an anti-virus system can only recognize attacks that have already been identified in the wild. Consequently, anti-virus systems are fairly ineffective toward attacks that target a limited number of customers, which have a restricted diffusion.

Moreover, the growing complexity of operating systems that run on mobile terminals increases the chance that traditional vulnerability, such as buffer overrun, race conditions or other security related errors, can be exploited to execute arbitrary code. This kind of malware is not delivered within a trojaned executable application, but just as ordinary data files. Such data, when processed by the vulnerable application, could cause the injection of malicious code in the system, which would be undetected using traditional anti-virus approaches. Similarly unsatisfactory are those solutions that do not restrict the resource usage to specific applications, and consequently enable a malicious application to execute nefarious activity such as credit exhaustion, message forwarding without notifying the user, and so on. While somewhat resembling an anomaly-based paradigm and notionally providing an effective security measure for a mobile terminal, such a mechanism cannot be deployed on existing cellular phones, hence it does not provide a complete solution for a mobile telecom operator, which should also provide security for devices that do not support the evolution of the operating system. Moreover, an attack that originates within a trusted application cannot be blocked with this approach. Such an attack may be possible because of a security bug present in the application itself.

The review of the prior art provided in the foregoing also shows that certain prior art solutions are strictly related to a traditional Internet context, and, as such, are based on the analysis of the network traffic flows. Such an approach does not lend itself to implementation at the level of a cellular phone or the like.

More generally, in mobile communications it is important to deploy an adequate mechanism to protect both the network and the end customers. Common security systems are insufficient in the context of cellular phone networks: for example, devices such as firewalls and Intrusion Detection Systems can protect servers that are located on the backbone infrastructure and are based on standard IP network technology; but they cannot avoid that a self-replicating malware propagates to other cellular phones via MMS messaging; analogously, it is very difficult to intercept a Trojan horse program that the user has inadvertently downloaded from a rogue site, or has been passed away using a Bluetooth or other connection different from the mobile network connection (other possible connections that can be made available to mobile terminals are, e.g., Wi-Fi (ITU 802.11), infrared link, WiMax.

As a further point, a system intended to protect a cellular network against malware must not be limited to a specific technology. For instance, a system that can only be used to protect against traditional attacks into GPRS network packets and is not effective against malware that is installed on the cellular phone using other sources, such as a Bluetooth connection, a direct download from a standard computer or software delivered on an external memory card would be largely unsatisfactory.

The foregoing description of the current situation indicates that the need exists for improved arrangements capable of ensuring cellular phone security, both on the network side and the end customers side, in a more satisfactory way as compared to the solutions according to the prior art described previously.

Specifically, the need is felt for improved arrangements specifically adapted for use within mobile communication networks that:
- are exempt from the intrinsic limitations of anti-virus systems when dealing with attacks that target a limited number of customers, which have a restricted diffusion;
- are able to deal successfully with malware delivered as ordinary data files;
- do not rely on the analysis of network traffic; and
- are not limited to a specific technology.

The object of the invention is thus to provide a satisfactory response to that need.

According to the present invention, that object is achieved by means of a method having the features set forth in the claims that follow. The invention also relates to a corresponding system, a related network as well as a related computer program product, loadable in the memory of at least one computer and including software code portions for performing the steps of the method of the invention when the product is run on a computer. As used herein, reference to such a computer program product is intended to be equivalent to reference to a computer-readable medium containing instructions for controlling a computer system to coordinate the performance of the method of the invention. Reference to "at least one computer" is evidently intended to highlight the possibility for the present invention to be implemented in a distributed/ modular fashion.

The claims are an integral part of the disclosure of the invention provided herein.

A preferred embodiment of the arrangement described herein is thus a method of identifying malicious messages transmitted over a mobile communication network including a plurality of mobile terminals, the method including the steps of:
- equipping said mobile terminals with sentinel modules for monitoring messages passing through the respective mobile terminals, wherein said sentinel modules identify as a candidate malicious message any message passing through said mobile terminals and failing to comply with a first set of patterns and issue a corresponding sentinel identification message;
- providing a set of (i.e. one or more) probe modules for monitoring messages transmitted over said network, wherein said set of probe modules identifies as a candidate malicious message any message transmitted over said network and failing to comply with a second set of patterns and issue a corresponding probe identification message; and
- identifying as a malicious message any message for which identification messages are received from a plurality of modules out of said sentinel modules and said set of probe modules.

A particularly preferred embodiment of the arrangement described herein includes the steps of:
- providing at least one client honeypot module for receiving and processing any messages sent to said client honeypot module to produce corresponding processing results, whereby said client honeypot module identifies as a candidate malicious message any message producing a processing result failing to comply with a third set of patterns and issues a corresponding client honeypot identification message, and
- identifying as a malicious message any message for which identification messages are received from a plurality of said modules out of said sentinel modules, said set of probe modules and said at least one client honeypot module.

Those of skill in the art will promptly appreciate that the patterns or "rules" included in the first, second and third sets mentioned in the foregoing may vary depending on the features of the malware sought to be identified and countered.

For instance, situations increasingly encountered in mobile networks at the time this application is filed indicate a prevailing form of malware in the form of otherwise "innocent" messages (e.g. MMS's) transmitted towards mobile phones and having associated executable files. These files are adapted to cause, for instance, the "infected" phone to automatically dial in rapid sequence numbers e.g. as included in the phone's phonebook with the aim of propagating undesired calls/messages and/or exhausting the phone's credit.

Under these circumstances, the first set of patterns stored in the mobile terminals will include e.g. the pattern or rule "messages having no associated files" or "messages having no associated executable files" so that any messages passing (i.e. transmitted or received) through a terminal and failing to comply with that pattern(s)—that is any message having associated executable files—will be identified as a candidate malicious message, thus causing the issue of corresponding sentinel identification message.

Similarly, the second sets of patterns or rules stored in the probe module(s), will include e.g. patterns or rules such as "standard traffic from a given terminal not including MMS's" or "average traffic from a given terminal below a given threshold". Any message transmitted over the network and failing to comply with such a pattern or rule—such as e.g. one or more MMS's sent (possibly in rapid sequence) by a terminal that usually does not send MMS's or messages corresponding to an abrupt increase of traffic from a terminal—will again be identified as a candidate malicious message, thus causing the issue of a corresponding service probe identification message. Advantageously, the patterns or thresholds in the second set may be adapted over time based on statistical analysis in order to possibly take into account the user's changing habits or attitudes.

Finally, the third set of patterns or rules stored in the client honeypot module(s) will include e.g. patterns or rules such as "honeypot not crashed", "dial function not activated" so that any message sent and processed by the client honeypot and leading e.g. to client honeypot crash or to calls/messages being dialled in short sequence will again be identified as a candidate malicious message, thus causing the issue of a corresponding client honeypot identification message.

The various identification messages will thus be aggregated so that a malicious message will be identified as one for which identification messages are received from plural sources—i.e. at least two modules out of the sentinel modules, the probe module(s) and, if present, the client honeypot module(s)—to activate further analysis and countermeasures.

The various identification messages are typically allotted different weights in the aggregation in order to take into account e.g. that a candidate malicious message leading to client honeypot crash has a substantial likelihood of being a truly malicious message: this is why including such a client honeypot represents a particularly preferred embodiment of the arrangement described herein.

Similarly, a candidate malicious message identified as such by two different types of modules (e.g. a sentinel module and the or one probe module) will expectedly have a higher likelihood of being a truly malicious message than a candidate malicious message identified as such by two identical types of modules (e.g. two sentinel modules).

It will thus be appreciated that:
- the arrangement described herein overcomes the intrinsic limitations of stand-alone anti-virus systems: in fact the arrangement described herein deploys multiple components on the cellular phones and on the network servers, and centrally correlates data from these sources to discover new malware and attacks in the mobile environment;
- the arrangement described herein is based on a distributed architecture, which correlates the information gathered on cellular phones with the data available on central network servers and allows a mobile telecommunication operator to create an infrastructure that can be effectively used to protect both the network and the customers by identifying the early propagation of an anomalous phenomenon as possibly resulting from a self-replicating malware, from some phishing or other fraudulent activity, or other attacks targeting the customer credit associated to the SIM (Subscriber Identification Module). The SIM is a hardware token, usually a smartcard that contains the identity of the customer, allowing him to use the cellular phone network;
- the arrangement described herein is in no way related to a traditional Internet context, and lends itself easily to implementation at the level of a cellular phone or the like;
- any anti-virus function (i.e. countermeasure) will not require awareness of details of the protected devices while being capable of acting against threats for which the signature is unknown;
- updates (essentially related to the patterns or rules) will be adapted to be transmitted via SMS messaging;
- the arrangement described herein is not limited to a specific technology and can be applied e.g. to UMTS networks also covering Bluetooth or other connections;
- resource usage is not restricted to specific applications, thus preventing any malicious application from executing nefarious activity such as credit exhaustion, message forwarding without notifying the user, and so on;
- the arrangement described herein can be deployed on existing cellular phones, and provides a complete solution for a mobile telecom operator, while so providing security for devices that do not support any evolution in their operating system;
- the arrangement described herein is in a position to identify an attack that originates within a trusted application.

More generally, the arrangement described herein deploys an adequate mechanism to protect both the network and the end customers, by avoiding that a self-replicating malware propagates to other cellular phones via MMS; analogously, the arrangement described herein is able to intercept a Trojan horse program that the user has inadvertently downloaded from a rogue site, or has been passed away using a Bluetooth, or other connection. In fact the arrangement described herein is able to monitor a plurality of different hardware and software resources, which results in a better identification of known and unknown threats.

BRIEF DESCRIPTION OF THE ANNEXED DRAWINGS

The invention will now be described, by way of example only, with reference to the enclosed figures of drawing, wherein.

DETAILED DESCRIPTION OF PREFERRED EMBODIMENTS OF THE INVENTION

Figure 1:
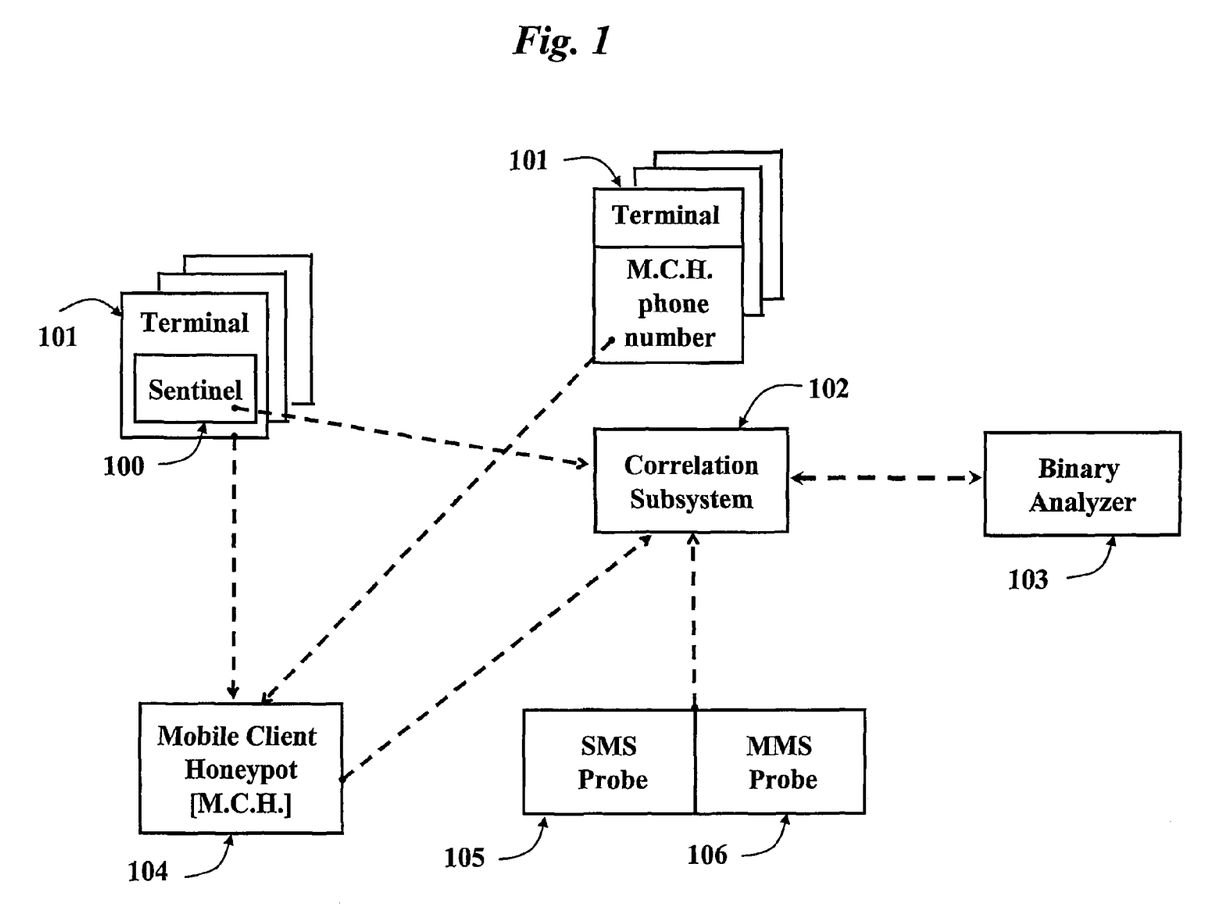
FIG. 1 shows an exemplary architecture of the arrangement described herein.

FIG. 1 shows a set of specific components included in an exemplary architecture described herein. A first component 100, called "Sentinel", is installed on a certain number of Mobile Terminals 101 to increase the probability of capturing an anomaly.

The Sentinel 100 monitors some specific resources of the Mobile Terminal 101. The Sentinel 100 has stored therein a (first) set of patterns or rules that identify the ordinary expected behaviour of the Mobile Terminal 101 in terms of messages passing (i.e. transmitted or received) by the terminal 101. Whenever the Sentinel 100 detects something "out of the ordinary" (that is any messages that do not comply with the ordinary patterns or rules, such as, e.g., an application that creates a hidden network connection, or sends a message without notifying the user, etc.), the Sentinel 100 forwards a identification message including all the relevant information on the message(s) held to represent a candidate malicious message to a Central System 102, which acts as a collector and a correlation subsystem.

The local analysis executed by the Sentinels 100 is integrated by a set of Central Probes 105, 106 that are deployed on the messaging servers present in the mobile network infrastructure. Specifically, the architecture described herein includes two specific Probes: a first probe 105 analyzes SMS messages and a second probe 106 analyzes MMS messages. These two Probes 105, 106 compare the instantaneous messaging activity against a set of pre-defined statistical indicators (i.e. patterns or rules) stored therein, such as the average number of messages exchanged, the average size of the message, the average number of message per user, the distribution of high-frequency payloads, etc.

Whenever any of the Probes 105, 106 detects something "out of the ordinary", that is any messages that do not comply with the ordinary patterns or rules stored, such as, e.g., any messages that lead to an unexpected increase in, say, the average number of messages exchanged, the average size of the message, the average number of message per user, the distribution of high-frequency payloads, the Probe in question forwards a identification message including all the relevant information on the message(s) held to represent a candidate malicious message to the Central System 102.

In addition to the Sentinels 100 and the Probes 105, 106, the preferred embodiment of the arrangement described herein as illustrated in FIG. 1 also includes one or more so-called Client Honeypot Modules 104.

A "honeypot" is a resource that lends itself to be used in a unauthorized or illicit way. Stated otherwise, a honeypot is a sort of "bait" resource that is able to process any executable code received and, to monitor the execution results, including catastrophic results (e.g. server crash) without affecting other useful "production" resources. In brief, a honeypot is security resource whose value lies in being probed, attacked, or compromised (see, for instance, the Spitzner reference already mentioned in the introductory portion of this description.

As better detailed in the following in connection with FIG. 4, the client honeypot modules as considered herein differ from conventional honeypots that have been used to study and entrap hackers and self-replicating malware in the Internet. In fact, conventional honeypots rely on vulnerable services exposed to the general public to capture nefarious activity; in the cellular phone context, it is impractical to expose a vulnerable service; hence a new way to attract hackers and malware has preferably to be conceived. The solution described herein addresses this issue proposing an alternative implementation for the honeypot, suitable for the cellular phone network, to be described in the following.

In brief, whenever the (client) Honeypot 104 detects something "out of the ordinary", by detecting that processing of any message attracted by the Honeypot (e.g. executing an executable attachment) leads to a result that do not comply with any ordinary patterns or rules stored therein, thus leading, e.g., to a system crash, or to a system phonebook being scanned and messages/calls being rapidly sent in sequence to the addresses stored therein, the Honeypot 104 forwards an identification message including all the relevant information on the message(s) held to represent a candidate malicious message to the Central System 102.

The Central System 102 acts as Correlation Subsystem 102, which collects and aggregates together anomalous events (i.e. identification of candidate malicious messages reported from different sources) by, creating timelines and top-level views of the undergoing phenomenon. Such a system may allow e.g. a human operator to quickly identify the problem and take the appropriate countermeasures.

Preferably, the Central System 102 has associated a Binary Analyzer 103 to perform deep analysis of malware, and a configuration mechanism that allows in a centralized fashion dispatching of policies to the Sentinels 100, the Client Honeypot Modules 104 and the Probes 105, 106. The same mechanism also permits remote "tuning" of the probes.

The Binary Analyzer 103 is provided with the aim of performing an analysis of any message held to be malicious (e.g. an unknown application) and/or to execute the application itself in a sand-boxed environment, to better identify the source of the anomalous behaviour.

Those of skill in the art will appreciate that the arrangement described herein is based on the recognition that, in a cellular phone network, it is unfeasible to strictly monitor (e.g. read packet-by-packet) the network traffic while—conversely—it is relatively easy to monitor any anomalous behavior in the mobile terminals.

The exemplary embodiment illustrated in FIG. 1 relies on mechanisms that are typically available on all of the most important operating systems used in the context of mobile terminals, the Symbian Operating System being a case in point.

Figure 2:
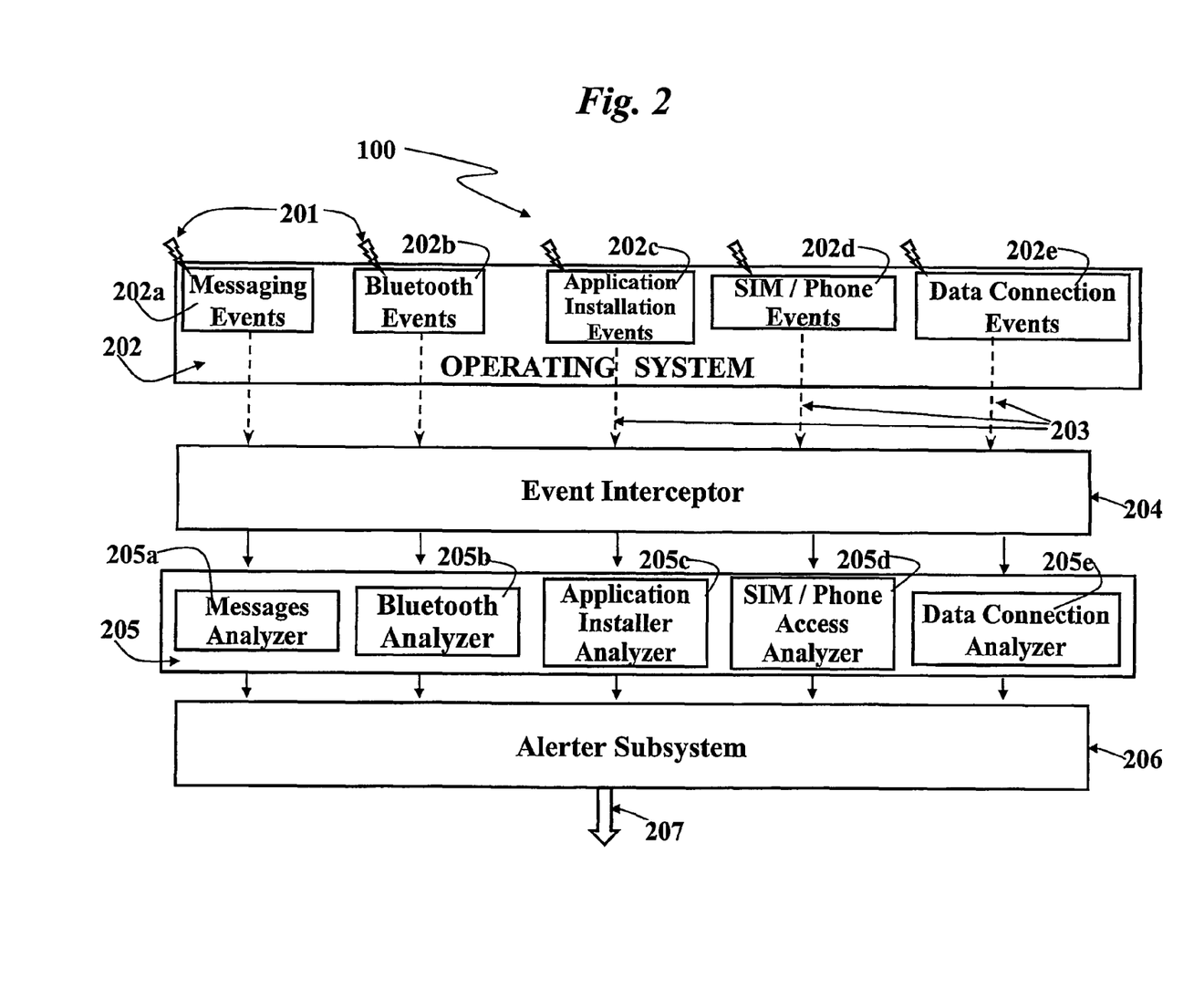
FIG. 2 shows a schematic architecture of the a sentinel component of the arrangement of FIG. 1.

Typically, the Sentinel 100, whose architecture is shown in details in FIG. 2, is a package that performs a systematic analysis of the resource usage patterns of the applications on a mobile terminal (cellular phone) 101, searching for any anomalous behavior. Its purpose is to monitor phones of real users (without accessing sensitive data) so to have access to local information that cannot be monitored from a central point, such as: standard user behavior, numbers in the phonebook, Bluetooth connections.

The Sentinel 100 works as follows: an operating-system event 201, such as an incoming message, or the installation of an application, is handled by a relative operating-system component 202a, 202b, 202c, 202d and 202e, and translated in a software event 203. An event interceptor 204 is the sentinel sub-component that is notified by the Operating System that something has happened. This component 204 builds a representation of the event that is independent of the Operating-System and invokes respective analyzer module 205a, 205b, 205c, 205d or 205e each related to one of the operating-system component 202a, 202b, 202c, 202d and 202e. The analyzers 205a to 205e (indicated as a whole as 205) perform a series of controls that are described in details in the following. Whenever an anomalous condition is detected, the analyzer invokes an alerter subsystem 206 that encapsulates all the relevant information in a data packet 207 and sends the said packet to the central correlation subsystem 102.

The various analysis components perform the following tests.

The message analyzer 205a processes any incoming and outgoing message, specifically MMS, SMS, Bluetooth file exchange and e-mails (when the terminal provides this option). It can search each message for compliance or non compliance with a number of rules (or patterns) including e.g.:

Binary executable content, usually related to the effect of propagating some application; this payload is usually identifiable from the specific mime-type;

Hyperlink present in the text section that may be related to some phishing activity;

Unknown sender: the greater majority of messages arrive from senders that are usually present in the phonebook; unknown senders can be considered suspect;

Message being sent to or received from Client Honeypot Modules: usually, they are correlated to malicious activity;

Repeating message: if a given message is received more than once in a limited time interval, it may be correlated to the spreading of an anomalous phenomenon;

Messages (usually an SMS) containing some configuration string commands that may result in a configuration update.

It can also check if messages are sent or received by a new unknown application installed by the user on the terminal instead of the specific pre-installed application provided with the operating system.

Similarly, the Bluetooth analyzer 205b monitors any modification to the Bluetooth radio configuration, detecting applications that try to silently switch on the system. If the terminal is provided with one or more short range access connection of a type other than Bluetooth, analyzers corresponding to analyzer 205b can be adopted.

The application analyzer 205c checks whether an installed application tries to start at boot-time; it does so by monitoring the creation of a specific system object, called "Recognizer" in the context of the Symbian Operating System; moreover, by monitoring file-system related operations, the analyzer is also able to detect when a new binary file appears in the system and whether some application is accessing sensitive information (such as, phonebook data, message contents, pictures, movies and audio files recorded in the terminal).

The Phone Access analyzer 205d monitors applications that try to access to the phone control, to prevent credit exhaustion due to illicit calls or the use of added-value services. The SIM Access analyzer 205*d* also monitors any access to the SIM from unknown applications, to prevent the lockout of the SIM (which can be caused by repeatedly entering the wrong PIN/PUK several times; as is well known, the PIN (Personal Identification Number), is a secret number that prevents other people to access to the SIM; the PUK is the Personal Unlocking Code, which is used to unlock the SIM when the user has entered the wrong PIN for more than three times.

The Data Connection analyzer 205*e* monitors the use of Internet connections from unknown applications, to detect unauthorized activity and prevent credit exhaustion due to the use of the network.

Whenever the sentinel 100 detects an anomalous event, it identifies the responsible application and checks if the application has already been inserted in the "Misbehaving Application List"; if this is not the case, an application fingerprint is calculated (for example, by applying the MD5 or the SHA-1 algorithm to the executable binary code), it is stored in the list and marked as new; otherwise, the list already contains the application and its related fingerprint.

Finally, the sentinel 100 sends an alert to the correlation subsystem 102, by using some mechanism for data connection; in the presently preferred embodiment, a standard GPRS connection is used for that purpose, but the transport mechanism can be selected at will (MMS, SMS). The alert contains: the unique ID of the sentinel 100, the violation that has been detected, and the event time.

If the application signature is marked as new, the application binary executable is included in the alert, otherwise only the application fingerprint will be sent.

The sentinel 100 also sends a beacon to signal its operational state; this mechanism is used to monitor the state of the sentinel network, and detect a significant disappearance of them; of course, this may be caused by a standard situation, such as the user switching off the phone during the night, or because of some bug, or also because of an attacker that tries to shut down the other application running on the phone. In case of temporary network unavailability the sentinel 100 is able to log and store data (until the memory of the cellular phone permits it) and postpone the alert sending.

Figure 3:
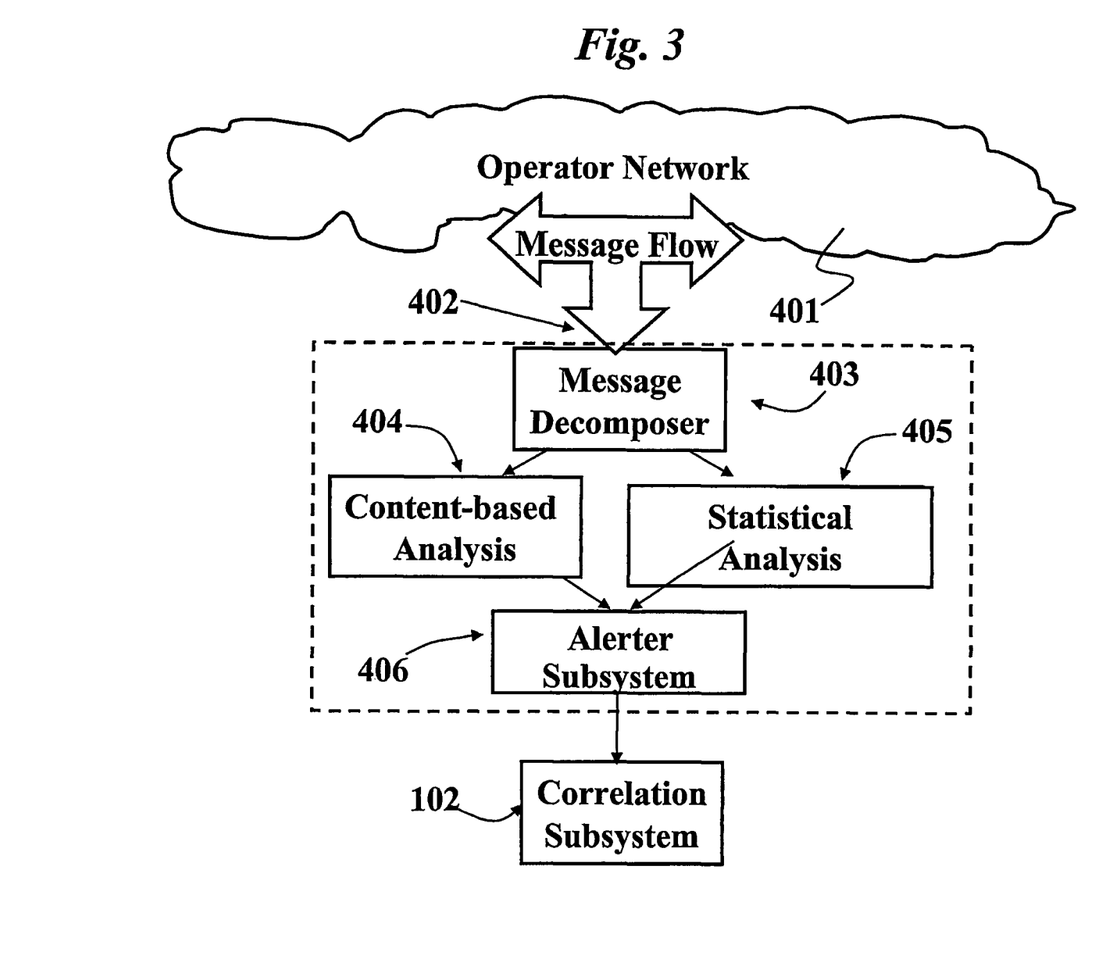
FIG. 3 shows a block diagram of the functionalities of a probe component of the arrangement of FIG. 1.

FIG. 3 shows the functionalities of the probes 105, 106 that analyze the flow of messages traversing the cellular phone network onto which the arrangement described herein is deployed. In FIG. 3 such a network is designated as a whole by the reference numeral 401. Each time a message enters the network, a copy 402 of the message is delivered to either probe (as indicated, the probe 105 analyzes SMS messages and the probe 106 analyzes MMS messages).

The block 403 indicates an operating phase where the probe (105 or 106) decomposes the message in view of subsequent content-based and statistical analysis. The block 404 indicates an operating phase where the probe (105 or 106) performs a Content-based analysis of he message: this can reveal anomalies at the message level, or the presence of suspect payloads (for example, .SIS files or HTML links).

The block 404 indicates an operating phase where the probe (105 or 106) performs a Statistical analysis of the message: this is based on the Anomaly Detection paradigm, and is useful to identify massive attacks (such as distributed denial of services performed by overwhelming a terminal with a huge number of messages) or the fast spreading activity of a virulent malware.

More specifically, during the decomposition phase 403, the probe first parses the received message, splitting the header from the content. The header is used essentially in an operating phase represented by the block step 405 to perform the statistical analysis; the following counters are updated, and checked against a threshold:

total number of messages per hour, for each part of the day (morning, afternoon, evening, night);

dimension of the whole message and of single attachments;

total number of messages sent/received by the average user (grouped in different classes of users accordingly to profiles of message service use);

total number of messages per hour having a significant part of the payload being identical; and average "time-to-live" for each replicated message; the time-to-live is defined as the interval of time during which the message continues to appear in the network.

If a violation is detected, an alerter subsystem 406 is invoked to send an alert to the correlation subsystem 102. The alert contains: the unique ID of the probe, the violation that has been detected, the event time and the message that caused the violation.

Detection systems based on the Anomaly Detection paradigm require a preliminary training stage to define (e.g. to compute) the set of patterns or rules that identify the ordinary behavior of the system. In the exemplary context considered herein, this is represented by the average values of thresholds. A violation occurred if the counter is out of the interval centered on the threshold value and larger at least two times the standard deviation. These parameters (average value and standard deviation) can be estimated by analyzing the network behavior in steady conditions.

The content based analysis 404 is executed by parsing in the step 403 the message and identifying the single attachment that compose the message itself. In case of SMS, usually there is just a text-based content, which is searched for added-value telephone numbers or URL-like entries embedded into it.

For what concerns MMS, several different objects may be wrapped in the message. Objects in MMS are identified using the associated mime-type; the probe checks whether the message has been formatted properly, if there are unrecognized attachments, if one of the attachment does not match its associated mime-type, and if there are executable attachments. If one of these conditions holds true, an alert is sent to the correlation subsystem 102.

Figure 4:
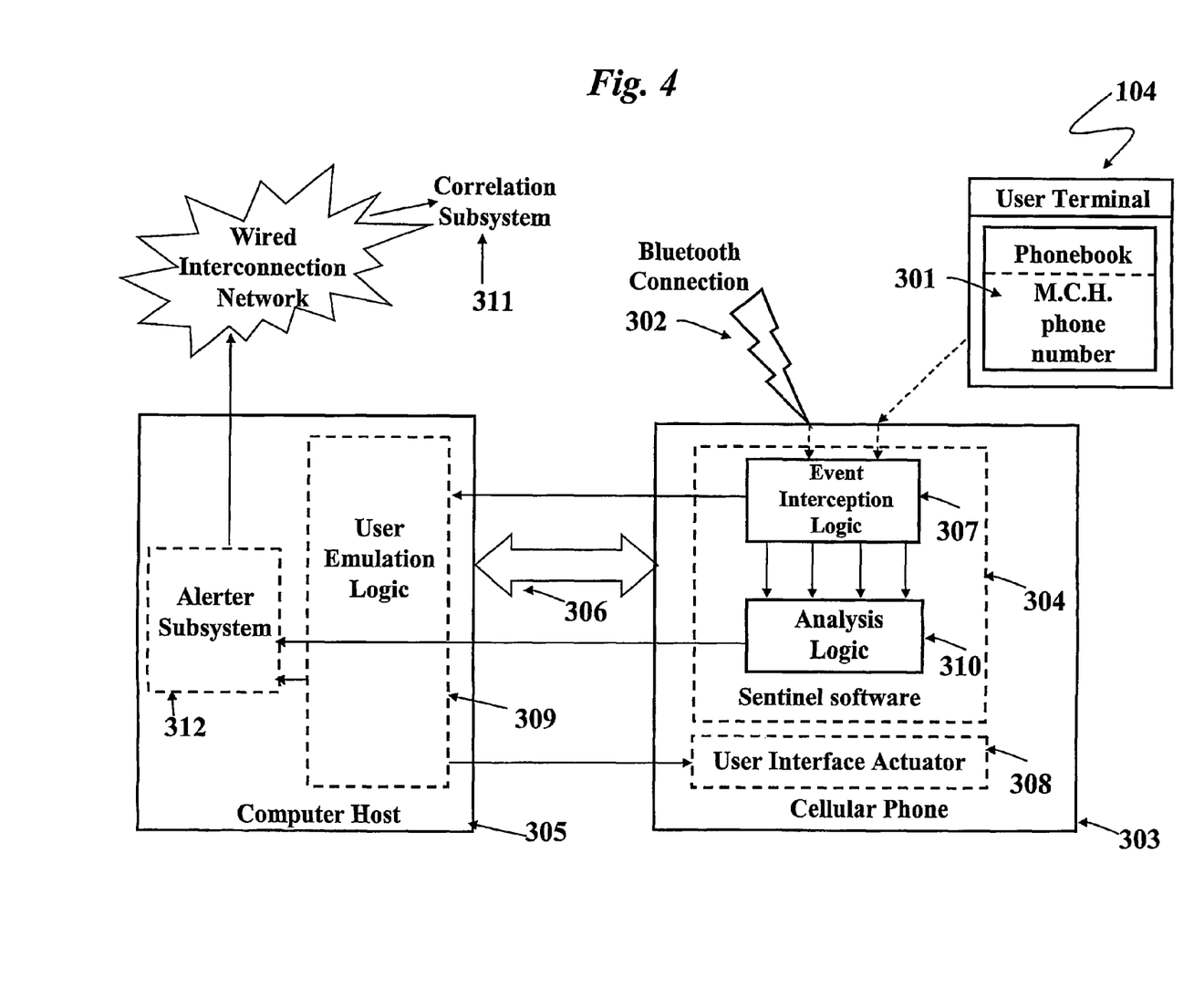
FIG. 4 shows a schematic architecture of a mobile client honeypot component of the arrangement of FIG. 1.

The Client Honeypot Module 104, shown in FIG. 4, operates together with the sentinels 100, acting as a controlled amplifier of anomalous conditions. Any operation that involves the Client Honeypot Module 104 is potentially associated to some anomalous behaviour; anomalous behaviour may be caused by configuration errors, wrong actions performed by users and, of course, by malicious programs.

An appreciable difference between the Client Honeypot Module 104 considered herein and any conventional honeypot lies in that conventional honeypots generally expose vulnerable services directly on the Internet. Human attackers, worms, and other kinds of malware may locate the honeypot by performing a directed scan; for example, vulnerable HTTP servers may be found by scanning for systems with port 80 open, and that answer with a valid HTTP response message. Mobile phones are usually not connected to the Internet, and when they are, they typically do not accept incoming connections. Usually, an attacker can exploit a mobile terminal if he knows its telephone number or if one of the short-range networking mechanisms is open and unprotected (Bluetooth).

As a consequence, the Client Honeypot Module 104 can be exposed to attacks using at least two different channels: the direct telephone access, related to the phone number, and a short-range access technology (Bluetooth).

The knowledge of the telephone number is often sufficient to deliver an effective attack, usually carried using some form of messaging, typically MMS and/or SMS. In order to increase the chance that an attack will target a Client Honeypot Module 104 its telephone number is made well known to the general public. For the mobile phone operator, this goal can be fulfilled by directly placing the Client Honeypot Module number in the SIM phonebook 301, as is the case for other services of general interest. This strategy is effective if it is possible to use different telephone numbers, placed at different position in the SIM phonebook 301, and if the associated names are not automatically identifiable as operator-specific. As it happens for traditional honeypots, the success of the system is highly dependant on the inability of the attacker to quickly discriminate a real system from the fake one.

In the embodiment described herein, the short-range technology, selected as secondary source for attacks, is a Bluetooth access 302. Bluetooth has been selected because it is commonplace in modern cellular phones and is one of the preferred channels for viruses spreading. It is very easy to extend such an approach to other short-range networking mechanism, such as IEEE 802.11 capable handset. Of course, since these channels operate on limited range, it is essential to deploy the probes in areas that have a lot of potential for incoming attacks. Such areas should be highly populated, and highly technological; for example, airports, congress rooms, luxury hotels are good candidates for deploying such short-range probes.

Another useful location can be inside the company perimeter (i.e. cafeteria, hall, labs) to monitor insider attacks. The Client Honeypot Module 104 is configured so that any incoming connection is accepted, and full access to the underlying services is allowed.

The Client Honeypot Module is composed by a cellular phone 303, instrumented using a special purpose implementation of a sentinel software connected to a personal computer 305, which provides a limited human-like interaction with the device (i.e. automatic installation and execution of the applications delivered through one of the available channels, replies to messages, URLs opening and file downloading).

The human-like interaction is realized with a combination of three different mechanisms.

An intercommunication protocol 306 is used to connect the cellular phone to a standard PC, so to perform operations such as message sending, phonebook updates, full system backups and other management operations.

An event interception logic 307, which is embedded in the sentinel software 304, that provides software signals for several significant events, such as the installation of a new application, an incoming message and so on.

An User Interface Actuator 308, which is able to perform various operations usually executed by the real user, such as pressing a key to confirm an operation or installing an application received via MMS/Bluetooth.

The host PC 305 runs a control intelligence 309 that emulates the user behaviour. The emulation is extremely essential, and basically consists in doing all the operations that typical security-aware users avoid; for example, the control intelligence 309 installs all the application that receives, always allow access to un-trusted Bluetooth devices, tries to follow links embedded in the messages and also answers to received SMS messages, potentially used by attackers to scan for active cellular phones.

The Analysis Subsystem 310 deployed on the Client Honeypot Module 104 is more sensitive than the one implemented on the standard sentinel and is also configured so to send the alerts through the host PC 305, allowing for more information to be transferred; for example, the Bluetooth analysis subsystem 205c can provide a complete log of all the Bluetooth data exchange (and not only the suspect ones); or, any message received (also those that would not trigger any alert) can be forwarded to the correlation engine.

The greater sensitivity of the Client Honeypot Module 104 gives the opportunity to analyze also phenomena that are not immediately identifiable as malicious, increasing the effectiveness of the whole infrastructure. This strategy works because it can be assumed that any operation that involves a honeypot is, in principle, something wrong. Moreover, the use of a honeypot also reduces the limitations affecting the sentinels installed on user terminals; in fact, all the resource of the honeypot can be used for anomaly identification, and there is no risk to disclose sensitive information.

When a Client Honeypot Module 104 identifies an anomalous condition, either because it is detected by the cellular phone analysis subsystem 205d, or because it is detected by a user-interface intelligence, an alert is forwarded to a correlation subsystem 311 using an alerter module 312. The alerter is moved from the sentinel directly on the host subsystem, so to take advantage of the direct interconnection of the host subsystem to the management network.

In a preferred embodiment Of the arrangement described herein, specific for the Symbian Operating System, the suspect applications can be delivered in two possible formats: the Symbian Executable format (used for .DLL, .EXE, .APP and for some other specific types) and the Symbian Install File (.SIS). The former specifies a program, which can be directly or indirectly executed on the target device; the latter contains an installer and the related component that make up the specific application (executable, icons, extra libraries). Moreover, all the Operating System Application Program Interfaces (APIs) are partitioned in two groups: critical API, which include all those function that manipulate a hardware resource; and standard API, which are all the functions that do not interact directly with a hardware resource. An example of critical API is that used to send a SMS message, or to initiate a telephone call.

In the arrangement described herein, the local analysis performed on the terminals 100 by the Sentinel Modules 101 and the Client Honeypot Module 104 is integrated centrally by the action of the MMS probe 106 and the SMS probe 105.

When one of the sensor components of the architecture (Sentinel 100, Client Honeypot Module 104 or the MMS/SMS probe 106, 105) detects a candidate malicious message (e.g. an application that has never been observed before), the executable code is forwarded to the Correlation Subsystem 102, which in turn invokes the Binary Analyzer 103 to perform an in-depth analysis.

As indicated, the various identification messages will may be aggregated by the Correlation Subsystem 102 by being allotted different weights in the aggregation. This in order to take into account e.g. that a candidate malicious message leading to a "crash" of the Honeypot Module 104 has a likelihood verging on certainty of being a truly malicious message, while e.g. a candidate malicious message temporarily detected as such by two sentinel modules 101 may finally turn out not to be malicious at all upon close scrutiny in the Binary Analyzer 103.

The correlation subsystem 102 acts as a central coordination point for the various entities involved in the process, aggregating all the alerts received, and providing a complete view on the operational state of the detection network. In the preferred embodiment, the correlation subsystem 102 performs the following actions:

- identify the beginning of a virus spreading phenomenon, by correlating the information received from a limited number of Sentinel Modules 100 and the Client Honeypot Module 104 with the overall anomalous messaging activities detected by the probes 105, 106. If a sentinel intercepts a message that contains an odd content, and the probe detects a large number of messages that match with this specific message, the correlation subsystem 102 that receives both the information alerts the human operator that a virus spreading phenomenon has been detected;
- identify a "multi-modal" malware, which is a malware that can propagate itself using different channels of communication. If a Sentinel Module 100 or the Client Honeypot Module 104 receives a malicious application through the short-range network channel (Bluetooth, in the embodiment) and the same application is identified as being part of messages detected by the probes, the Correlation Subsystem 102 issues an alert that indicates the potential diffusion of a multi-modal malware;
- if several independent Sentinel Modules 100 and the Client Honeypot Module 104 cease working simultaneously in a restricted temporal range, the correlation subsystem 102 issues an alert indicating a potential Denial-of-Service.

Of course, these rules are only exemplary of what can be done; the human operator can create other kind of rules that are better suited for a specific situation.

The correlation subsystem 102 also maintains a list of the application that have been already analyzed and observed; whenever an alert containing a freshly detected application is received, this application is checked versus the application data store and the global statistics related to its diffusion are updated; if, however, the application has never been received before, it is forwarded to the Binary Analyzer 103, that tries to identify the risk level associated with the application. By using a centralized approach, it becomes easier to collect and analyze quickly all the suspect application delivered by the other components of the architecture.

The data correlation algorithms implemented by the Correlation Subsystem 102 are known per se and do not require to be described in detail herein. In a preferred embodiment, correlation is implemented using an external correlation engine.

Although the embodiment is heavily based on some specific characteristics of the Symbian Operating System, it is perfectly admissible to devise an alternative implementation for the Sentinel Modules 100 and the Client Honeypot Module 104 on a different Operating System (i.e. Windows Mobile or PalmOS). The most relevant characteristics needed to create the sentinel software are fairly general and they are generally present in other Operating Systems as well.

Preferably, the Binary Analyzer 103 works according to the following steps:

- if a .SIS file has been received, the archive is unpacked and the binary component are saved in separate files (usually, a combination of .EXE, .APP and .DLL files); if just a single .EXE or .APP file is received, it will be the only file to be further processed;
- the analyzer 103 extracts the list of imported functions from the binary files. These functions may refer to custom-supplied dynamic link libraries (.DLL, which are generally bundled with the main executable in the .SIS file) or to some standard DLL, which contains the interface toward the services of the operating system. Note that an application may only use these functions to manipulate the device resources, for example to send a message or to activate the Bluetooth radio device;
- for each binary file, the analyzer 103 creates the call-graph of all the functions. The call-graph is a graph where the vertices are the entry points of the functions, and an edge connects the vertex V1 to the vertex V2 if the function represented by V1 invokes the function represented by V2. In the preferred embodiment, the analyzer 103 specifically analyzes binary files developed for the Advanced RISC Machine (ARM) CPU. By disassembling the code section of the executable, it is possible to identify all the relevant entry point by searching for the "BL" instructions; BL means "Branch with Link" and is the primitive mechanism to implement a subroutine call in the ARM assembly language. At the end of this step, each binary file is associated with its call graph. In Symbian environment, all the significant Operating System services have to be invoked passing through the main system interface, which is contained in some specific DLL, which are stored in the terminal memory (Read Only Memory—ROM). These functions usually appear as leaf vertices of the call-graph, and can be easily identified by looking at the list of imported functions that belong to the standard .DLLs;
- after creating the call-graph, it is identified whether the program uses a critical API or not; in this latter case, the program is classified as safe and the analyzer terminates its job;
- if the program uses a critical API, the system performs a heuristic analysis of the possible execution path, to identify the existence of some typical malware code fragments. Those fragments can be created by isolating a significant subroutine of a well-known malware: for example, the subroutine that installs a copy of the malware in some directory, or the set of routines that are used to send a copy of the executable using a MMS message, or a Bluetooth connection request. Fragments are easily described in terms of call-graphs, although this description may result imprecise. If such a graph matches a sub-graph in the program call-graph, then the program is identified as malevolent, and the analyzer provides the list of found matches; and
- if the program does not match any known fragment but uses a critical API, then it is classified as suspect, and further analysis is carried on by a human expert; the static analysis of binary code for security purposes is useful to detect malicious behaviors that are not used/activated during a standard execution on a device monitored by a Sentinel or a Client Honeypot Module (i.e. a time bomb, that is to say a sub-routine activated by a time trigger instead of human interaction).

Such analysis is conveniently done in a central point of the architecture, precisely the Binary Analyzer, for two main reasons:

- it is possible to do it on a dedicated server, with computational capabilities much higher than mobile devices, and
- an application seen on the network several times by different Sentinels does not have to be repeatedly analyzed.

It is possible that a given Symbian program is compressed or encrypted, to provide some form of tamper resistance against reverse engineering.

Of course, a similar technique can also be employed to protect the malware from the action of a virus scanner. However, although an automatic analysis of such a program is impossible, it is easy to identify this condition, because compressed/encrypted binaries have a small code section and a large, seemingly random, data section. Random sequence can be identified with a standard randomness test. In a preferred embodiment, the Maurer test has been selected as described in detail in Maurer, U. 1990. "A Universal Statistical Test for Random Bit Generators. Advances in Cryptology", published in the CRYPTO'90 Lecture Notes of Computer Science, pages 409-420 by Springer-Verlag. If the test, applied over the data section of the application, is positive, the program is classified as compressed/encrypted and further analysis is carried on by a human expert.

Those of skill in the art will easily appreciate that the Client Honeypot Module 104 described herein can be improved by incorporating thereto the functionality of a standard Internet honeypot, that is to say it will expose fake or vulnerable services, in order to attract attacks and malicious use of them.

Moreover, the architecture of the MMS and SMS probes 105, 106 can be easily extended to include other mechanisms of messaging; the model described and the statistics that are used to perform the dynamic analysis for anomalies can also be used in the context of generic message-based communication networks (i.e. Instant Messaging, chat).

Consequently, without prejudice to the underlying principles of the invention, the details and the embodiments may vary, also appreciably, with reference to what has been described by way of example only, without departing from the scope of the invention as defined by the annexed claims.

The invention claimed is:

1. A method of identifying malicious messages transmitted over a mobile communication network comprising a plurality of mobile terminals, comprising the steps of:
    equipping said mobile terminals with sentinel modules for monitoring messages passing through the respective mobile terminals, wherein said sentinel modules identify as a candidate malicious message, any message passing through said mobile terminals and failing to comply with a first set of patterns, and issue a corresponding sentinel identification message;
    providing a set of probe modules for monitoring messages transmitted over said network, wherein said set of probe modules identifies as a candidate malicious message, any message transmitted over said network and failing to comply with a second set of patterns, and issues a corresponding probe identification message; and
    identifying as a malicious message any message for which identification messages are received from two different types of modules out of said sentinel modules and said set of probe modules.

2. The method of claim 1, comprising the steps of:
    providing at least one client honeypot module for receiving and processing messages sent to said client honeypot module to produce corresponding processing results, wherein said client honeypot module identifies as a candidate malicious message, any message producing a processing result failing to comply with a third set of patterns, and issues a corresponding client honeypot identification message; and
    identifying as a malicious message, any message for which identification messages are received from two different types of modules out of said sentinel modules, said set of probe modules and said at least one client honeypot module.

3. The method of claim 1, comprising the steps of:
    providing said sentinel modules with a set of analyzer modules; and
    checking in each said analyzer module said messages passing through the respective mobile terminals against a respective set of patterns.

4. The method of claim 1, comprising a step wherein said set of probe modules performs a content-based analysis of said messages transmitted over said network to reveal candidate malicious messages as messages presenting anomalies at the message level or having associated suspect payloads.

5. The method of claim 1, comprising a step wherein said set of probe modules performs a statistical analysis of said messages transmitted over said network to reveal candidate malicious messages on the basis of an anomaly detection paradigm or a fast spreading activity of a virulent malware.

6. The method of claim 1, comprising a step wherein said set of probe modules defines at least partly said second set of patterns as a function of reference average values of counters, whereby said probe modules identify as a candidate malicious message, any message transmitted over said network and leading to one said counter being out of an interval positioned on a reference value for said counter and larger than a given amount of the standard deviation of said counter.

7. The method of claim 1, comprising a step wherein said set of probe modules performs a statistical analysis of said messages transmitted over said network by checking a set of counters against patterns represented by respective thresholds, said counters comprising at least one of:
    a total number of messages over a given time interval;
    a dimension of a whole message with possible attachments;
    a total number of messages exchanged by a terminal;
    a total number of messages over a given time interval having substantially identical payloads; and
    an average time Interval the message continues to appear in the network.

8. The method of claim 1, comprising the steps of aggregating said identification messages of candidate malicious messages issued by said modules and allotting to said identification messages of candidate malicious messages different weights in the aggregation as a function of the type of module which issued the identification message.

9. The method of claim 8, comprising the step of aggregating said identification messages of candidate malicious messages issued by said modules according to at least one criterion selected from:
    a) if an identification message is received from a sentinel module related to a candidate malicious message and at least one said probe module detects a large number of messages matching with said candidate malicious message, said candidate malicious message is identified as the source of a virus spreading phenomenon;
    b) if an identification message is received from a sentinel module or said at least one client honeypot module related to a candidate malicious message and the same candidate malicious message is identified as a part of messages transmitted over said network as monitored by at least one said probe module, said candidate malicious message is identified as the source of the potential diffusion of a multi-modal malware; and
    c) if several of said sentinel modules and said at least one client honeypot module cease working simultaneously in a restricted temporal range, a potential denial-of-service is detected.

10. The method of claim 1, comprising the steps of:
    analyzing said messages identified as malicious messages on the basis of said identification messages received from a plurality of said modules, devising configuring policies for said sets of patterns for said modules as a function of the results of analyzing said messages identified as malicious messages; and dispatching said configuring policies for said sets of patterns to said modules.

11. A non-transitory computer program product, loadable in the memory of at least one computer and comprising software code portions capable of performing the method of claim 1.

12. A system for identifying malicious messages transmitted over a mobile communication network comprising a plurality of mobile terminals, comprising:

sentinel modules equipping said mobile terminals for monitoring messages passing through the respective mobile terminals, wherein said sentinel modules identify as a candidate malicious message, any message passing through said mobile terminals and failing to comply with a first set of patterns, and issue a corresponding sentinel identification message;

a set of probe modules for monitoring messages transmitted over said network, wherein said set of probe modules identifies as a candidate malicious message, any message transmitted over said network and failing to comply with a second set of patterns, and issues a corresponding probe identification message; and a correlation subsystem for receiving identification messages from said sentinel modules and said set of probe modules and for identifying as a malicious message, any message for which identification messages are received from two different types of modules out of said sentinel modules and said set of probe modules.

13. The system of claim 12, comprising:

at least one client honeypot module for receiving and processing messages sent to said client honeypot module to produce corresponding processing results, wherein said client honeypot module identifies as a candidate malicious message, any message producing a processing result failing to comply with a third set of patterns, and issues a corresponding client honeypot identification message; and a correlation subsystem for receiving identification messages from said sentinel modules, said set of probe modules and said at least one client honeypot module, and for identifying as a malicious message, any message for which identification messages are received from two different types of modules out of said sentinel modules, said set of probe modules and said at least one client honeypot module.

14. The system of claim 12, comprising sentinel modules equipped with an alerter subsystem to encapsulate in a data packet the relevant information on any said candidate malicious message.

15. The system of claim 12, wherein sentinel modules comprise a message analyzer for checking said messages passing through the respective mobile terminals for at least one of:

binary executable content;
hyperlink present in the text section;
unknown sender;
message being exchanged with said at least one client honeypot module;
repeating message;
message containing configuration string commands leading to configuration update; and
messages being exchanged with a new unknown application installed on the terminal.

16. The system of claim 15, wherein said sentinel modules comprise a Bluetooth analyzer for monitoring messages leading to any modification to the Bluetooth radio configuration or applications that try to silently switch on the Bluetooth facility of the terminal.

17. The system of claim 15, wherein said sentinel modules comprise an application analyzer for checking at least one of:

whether an application installed in the terminal tries to start at boot-time;
when a new binary file appears in the terminal; and
whether some application is accessing sensitive Information recorded in the terminal.

18. The system of claim 15, wherein said sentinel modules comprise a SIM/phone access analyzer to monitor applications that try to access at least one phone control in the terminal and the SIM of the terminal.

19. The system of claim 15, wherein said sentinel modules comprise a data connection analyzer to monitor at least one of the use of internet connections from unknown applications, unauthorized activity and credit exhaustion due to the use of the network.

20. The system of claim 12, wherein said set of probe modules comprises an alerter subsystem to send said probe identification message as a message comprising at least one of a unique identifier of the probe, the violation that has been detected, the event time and the message that caused the violation.

21. The system of claim 12, wherein said set of probe modules are deployed on messaging servers present in the mobile communication network.

22. The system of claim 13, comprising:

at least one client honeypot module having allotted a dial number for use in said mobile communication network; and
a dial number for said at least one client honeypot module stored in the phonebooks of said mobile terminals.

23. The system of claim 22, comprising at least one client honeypot module configured as a Bluetooth access point to said mobile communication network.

24. The system of claim 23, wherein said at least one client honeypot module comprises control intelligence emulating a security-unaware user by at least one of:

installing all the applications received;
steadily allowing access to un-trusted devices; and
trying to follow links embedded in the messages exchanged.

25. A mobile communication network comprising the system of claim 12.

* * * * *